United States Patent [19]

Edwards et al.

[11] Patent Number: 5,241,261
[45] Date of Patent: Aug. 31, 1993

[54] THERMALLY DEPENDENT SELF-MODIFYING VOLTAGE SOURCE

[75] Inventors: Arthur J. Edwards, Hoffman Estates, Ill.; Philippe B. Bauser, Ornex, France

[73] Assignee: Motorola, Inc., Schaumburg, Ill.

[21] Appl. No.: 842,305

[22] Filed: Feb. 26, 1992

[51] Int. Cl.$^5$ ............................. G05F 3/16; H02J 7/16
[52] U.S. Cl. .................................... 323/313; 323/314; 323/907; 322/33
[58] Field of Search .................. 322/33; 323/313, 314, 323/907

[56] References Cited

U.S. PATENT DOCUMENTS

| | | | |
|---|---|---|---|
| 3,152,298 | 10/1964 | Byles | 322/73 |
| 3,496,447 | 12/1967 | Thompson | 322/23 |
| 3,522,482 | 12/1967 | Thompson | 317/31 |
| 3,535,616 | 4/1968 | Rutherford et al. | 322/28 |
| 3,538,421 | 8/1968 | Young | 322/28 |
| 4,095,164 | 6/1978 | Ahmed | 323/8 |
| 4,325,018 | 4/1982 | Schade | 323/313 |
| 4,385,270 | 5/1983 | Balan et al. | 322/23 |
| 4,388,586 | 6/1983 | Lamoth | 323/283 |
| 4,629,967 | 12/1986 | Voss | 322/28 |
| 4,733,162 | 3/1988 | Haga et al. | 323/316 |
| 4,789,819 | 12/1988 | Nelson | 323/314 |
| 4,792,748 | 12/1988 | Thomas et al. | 323/312 |
| 4,857,823 | 8/1989 | Bitting | 323/314 |
| 5,053,640 | 10/1991 | Yom | 307/296.6 |
| 5,153,500 | 10/1992 | Yamamoto et al. | 323/314 |

FOREIGN PATENT DOCUMENTS

| | | | |
|---|---|---|---|
| 0152805 | 8/1985 | European Pat. Off. | 323/313 |
| 2506043 | 5/1981 | France | 323/313 |
| 0175131 | 9/1985 | Japan | 323/313 |

*Primary Examiner*—Steven L. Stephan
*Assistant Examiner*—Thomas M. Dougherty
*Attorney, Agent, or Firm*—Phillip H. Melamed; John H. Moore

[57] ABSTRACT

A thermally dependent self-modifying voltage source (115) is constructed with a first reference circuit (301) having a control input (311), a primary output (117) dependent on the control input, and a thermally dependent secondary output (303). The thermally dependent self-modifying voltage source also includes a thermally dependent reference (309) with an output (307). The thermally dependent secondary output (303) of the first reference circuit (301) and output (307) of the thermally dependent reference (309) are coupled to inputs of an amplifier (305). The amplifier (305) has an output (313) coupled to the control input (311) of the first reference circuit (301), wherein the primary output (117) of the first reference circuit is dependent on the amplified difference between the thermally dependent secondary output (303) of the first reference circuit and the output (307) of the thermally dependent reference (309). Preferably, the primary output (117) is used in a voltage regulator (121) for use in alternator based battery charging system (100).

17 Claims, 3 Drawing Sheets

THERMALLY DEPENDENT SELF-MODIFYING VOLTAGE SOURCE

FIELD OF THE INVENTION

This invention is generally directed thermally dependant self-modifying voltage sources. And for use in alternator based battery charging system voltage regulators.

BACKGROUND OF THE INVENTION

Alternator based battery charging systems use a voltage regulator to develop a charging voltage for maintaining a battery fully charged to a predetermined voltage level. Some systems require the charging voltage to have a negative temperature dependence. This requirement is caused by the need for a greater charge voltage at lower temperatures and a lesser charge voltage at higher temperature. Some of these systems require substantially no temperature variation of the charge voltage and then a negative temperature dependence of charge voltage above a predetermined threshold temperature in order to prevent overcharging the battery at high temperatures. Current systems do not accurately define this threshold temperature. Deficiencies include a soft transition around the threshold temperature that can vary by 20° C. Current systems are also impractical because they use additional and costly components and manufacturing processes. These deficiencies are undesirable and can cause poor field reliability.

What is needed is an improved thermally dependent self-modifying voltage source useable in a voltage regulator of an alternator based battery charging system that overcomes the deficiencies of the prior art.

SUMMARY OF THE INVENTION

A thermally dependent self-modifying voltage source is constructed with a first reference circuit having a control input, a primary output, dependent on the control input, and a thermally dependent secondary output. The thermally dependent self-modifying voltage source also includes a thermally dependent reference with an output. The thermally dependent secondary output of the first reference circuit and the output of the thermally dependent reference are coupled to inputs of an amplifier. The amplifier has an output coupled to the control input of the first reference circuit, wherein the primary output of the first reference circuit is dependent on the amplified difference between the thermally dependent secondary output of the first reference circuit and the output of the thermally dependent reference.

This thermally dependent self-modifying voltage source is useable in a voltage regulator for an alternator based battery charging system.

DETAILED DESCRIPTION OF A PREFERRED EMBODIMENT

Figure 1:
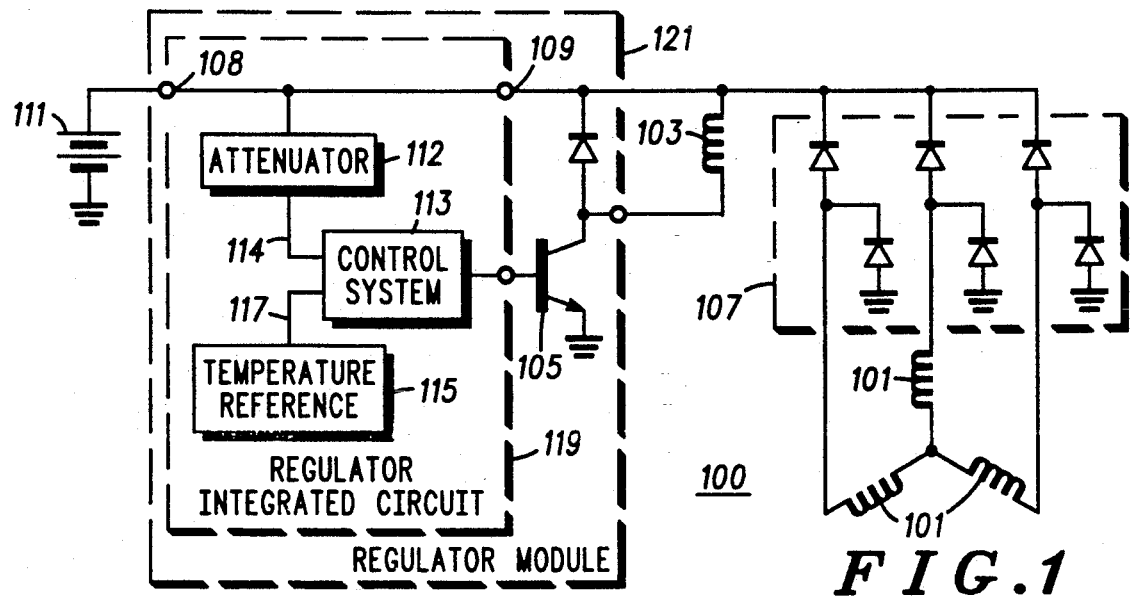
FIG. 1 shows a block diagram of an alternator based battery charging system constructed in accordance with the present invention.

FIG. 1 shows a block diagram of an alternator based battery charging system 100. This alternator based battery charging system 100 overcomes the deficiencies of prior art systems by using an improved temperature dependent control circuit. FIG. 1 illustrates the key alternator based battery charging system 100 components including an alternator stator 101, an alternator field winding 103, a transistor 105 and a battery 111.

When the alternator rotates, and the battery 111 needs charging, the alternator field winding 103 supplies magnetic excitation to the alternator stator 101. The alternator stator 101 then supplies the rectifier 107 with voltage. This voltage is rectified by the rectifier 107 to supply a charge voltage 109 to the battery 111. An attenuator 112 senses the voltage across the battery 111 by virtue of its connection to a regulator voltage sense terminal 108. The attenuator 112 then supplies a control voltage 114 as an input to a control system 113. The control system 113 is a conventional alternator regulator control system. A thermally dependent self-modifying voltage source, further referred to herein as a temperature reference 115, supplies a thermally dependent reference voltage 117. This thermally dependent reference voltage 117 corresponds to the primary output of the temperature reference 115 and is coupled as an input to the control system 113. The control system 113 then controls the transistor 105 responding to the relationship between the control voltage 114 and the thermally dependent reference voltage 117.

When voltage across the battery rises, the regulator voltage sense terminal 108 sense terminal 108 rises, and the control voltage 114 increases. When the control voltage 114 is larger than the thermally dependent reference voltage 117, the control system 113 drives transistor 105 into cut-off. This causes the depletion of the charge voltage 109. As the charge voltage 109 decreases, the control voltage 114 decreases. When the control voltage 114 decreases below the thermally dependent reference voltage 117, the control system 113 drives the transistor 105 into saturation. This releases the alternator field winding 103 causing the charge voltage 109 to increase. As operation continues, the charge voltage 109 causes the control voltage 114 to exceed the thermally dependent reference voltage 117, and the cycle repeats. Therefore, by selecting a particular thermally dependent reference voltage 117, the charge voltage 109 to the battery is controlled and the battery 111 is maintained at a desired charge voltage.

In the preferred embodiment a regulator module 121 is constructed as a fully integrated circuit assembly. The temperature reference 115 measures temperature within the regulator module. The temperature reference 115 supplies the thermally dependent reference voltage 117 used in the alternator based battery charging system 100.

Figure 2:
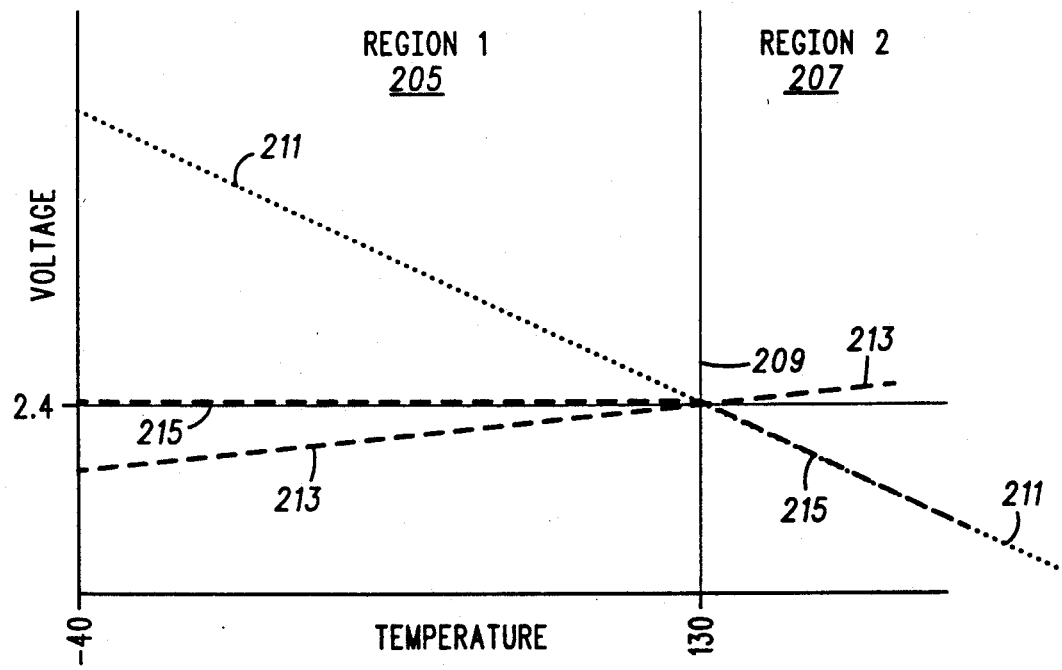
FIG. 2 shows a graph illustrating voltages provided in the FIG. 1 system.

FIG. 2 shows the relationship between temperature and the thermally dependent reference voltage 117, here shown as curve 215. The resulting charge voltage 109 and the voltage across battery 111 will have a temperature variation corresponding to this thermally dependent reference voltage 117. This relationship is assured because of the effect of the attenuator 112 during the operation of the regulator module 121.

From minus 40° C., to a threshold temperature of 130° C., corresponding to the reference number 209, the curve 215 stays constant. Above the threshold temperature of 130° C., the curve 215 decreases rapidly with increases in temperature.

Figure 3:
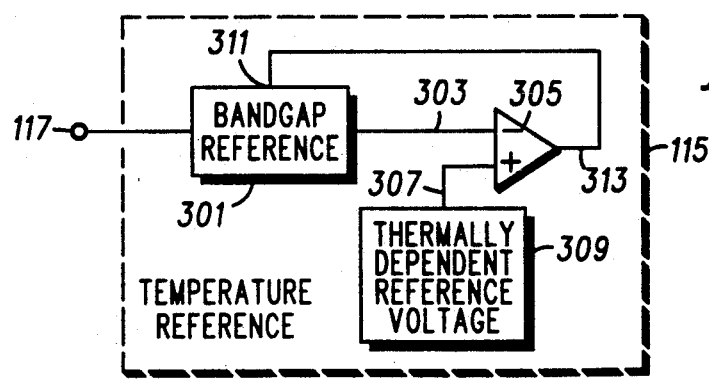
FIG. 3 shows a block diagram of a temperature dependent voltage reference circuit useable in the system in FIG. 1.

FIG. 3 further details the temperature reference 115 in block diagram form. The temperature reference 115 is constructed as a thermally dependant self-modifying voltage source. This temperature reference 115 implements the desired thermally dependent reference voltage 117 in a very well defined way over temperature. The temperature reference 115 also outputs this thermally dependent reference voltage 117 with a clearly defined transition around the threshold temperature of 130° C. This is accomplished with a minimum of additional components and the elimination of manufacturing process steps. The steps eliminated include the mounting and connection of an external temperature sensing element and an active circuit trim. These advantages over the prior art reduce the cost and improve the field reliability performance of the regulator module 121.

The temperature reference 115 is constructed as follows. A first voltage reference is constructed using a conventional bandgap reference circuit 301. Bandgap reference circuits are well known by those skilled in the art and have many variants that will substantially work in this embodiment. The bandgap reference circuit 301, modified by additional circuitry, makes up the temperature reference that supplies the thermally dependent reference voltage 117. This thermally dependent reference voltage 117 is dependent on a control input 311, that is sourced by a signal 313. The signal 313 only influences the thermally dependent reference voltage 117, derived from the bandgap reference circuit 301, above the threshold temperature of 130° C. This results from the construction of an amplifier 305 that is detailed below. The bandgap reference circuit 301 also supplies a thermally dependent secondary output 303 to the amplifier 305. A thermally dependent voltage reference 309 supplies a thermally dependent voltage 307 to another input of the amplifier 305. The amplifier 305 will provide the signal 313 as its output.

In FIG. 2, curve 213 represents the voltage supplied at the thermally dependent secondary output 303 of the bandgap reference circuit 301. This curve 213 has a small positive temperature dependence and is further described below. Curve 211, in FIG. 2, represents the thermally dependent voltage 307 supplied at the output of the thermally dependent voltage reference 309. This curve 211 has a large negative temperature dependence, and is further described below.

Below the threshold temperature of 130° C., the thermally dependent reference voltage 117, represented by curve 215, is constant because the thermally dependent secondary output 303 is lower than the thermally dependent voltage 307. Above 130° C., the thermally dependent voltage 307 is lower than the thermally dependent secondary output 303 and the amplifier outputs the signal 313. This signal controls the control input 311 of the bandgap reference circuit 301 lowering the thermally dependent reference voltage 117. For temperatures below the threshold temperature of 130° C., the amplifier 305 does not output the signal 313. This cause and effect is described in detail below.

Figure 4:
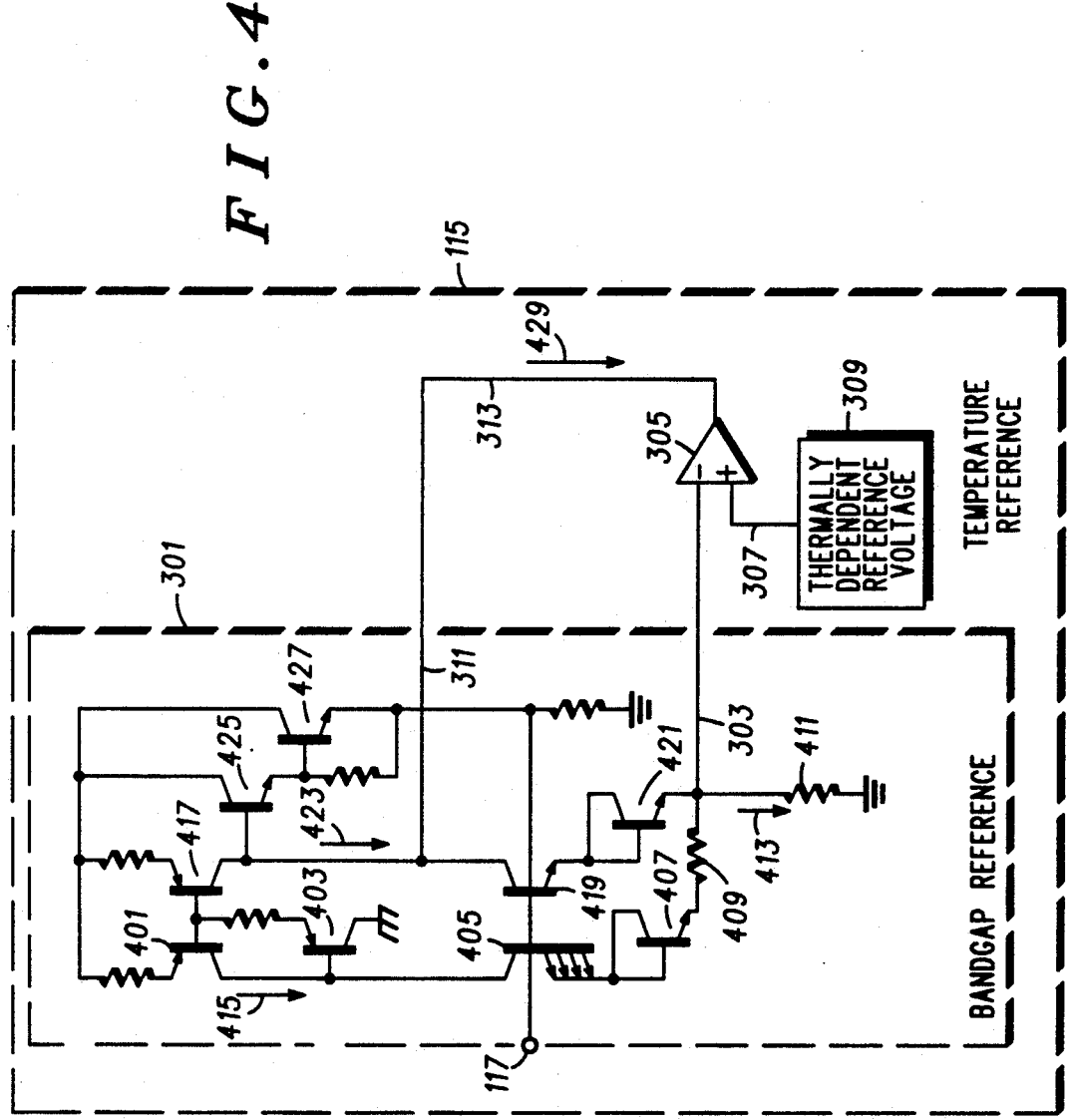
FIG. 4 shows a simplified schematic of the temperature dependent voltage reference circuit shown in FIG. 3.

Details of the temperature reference 115 are shown in FIG. 4 and are as follows. Transistors 401, 403 and 417 form a current mirror. The collector of transistor 401 represents an input to the current mirror. The collector of transistor 417 represents an output of the current mirror. The current mirror is coupled to a common base transistor pair 405 and 419. With a resistor 409, these transistors 405 and 419 perform the basic bandgap function as described below.

Transistors 407 and 421 are configured as diodes to raise the thermally dependent reference voltage 117 of the bandgap reference circuit 301 to a voltage more suitable for operation of the control system 113. Transistor 405 has an emitter area of four times the area of the emitter of transistor 419. This could be some other positive ratio if desired. Because of this emitter relationship, the current density in transistor 405 is four times less than the current density in transistor 419. This relationship creates a voltage differential across the resistor 409. Further, this voltage differential causes a current 415 to flow into the input of the current mirror. The resistor 409 determines the current mirrored in the current mirror. The current mirror then mirrors this current 415 reflecting a current 423 of the same magnitude at its output. Resistor 411 receives and combines the currents 415 and 423 into a current 413. The current 413 through resistor 411 supplies a voltage that serves as the thermally dependent secondary output 303 from the bandgap reference circuit 301 as detailed below.

A darlington transistor pair 425 and 427 are connected to the output of the current mirror. A high gain bipolar transistor or a MOSFET transistor could also be used in place of the darlington transistor pair 425 and 427. Transistor 427 is then coupled to the common base junction of transistors 405 and 419 supplying the thermally dependent reference voltage 117 of the bandgap reference circuit 301.

As mentioned above, selection of resistor 411 results in providing a output corresponding to the thermally dependent secondary output 303 of the bandgap reference circuit 301. This thermally dependent secondary output 303 has about a 4 mV/°C., positive temperature dependence. This results from the about minus 4 mV/°C., negative temperature dependence of the base-emitter junction of transistor 419 and the base-emitter junction of transistor 421. Curve 213 in FIG. 2 illustrates this temperature dependence.

In FIG. 4, a thermally dependent voltage reference 309 is supplied as part of the temperature reference 115. The thermally dependent voltage reference 309 is designed to have a strong negative temperature dependence, here about minus 5 mV/°C. This thermally dependent voltage reference 309 can be constructed in many different known ways. The output of this thermally dependent voltage reference 309 is illustrated in FIG. 2 as curve 211. Reference 309 is illustrated in more detail in FIG. 5 and will be described below.

In temperature reference 115 in FIG. 4, the amplifier 305 combines the thermally dependent secondary output 303 from the bandgap reference circuit 301 and the output 307 of the thermally dependent voltage reference 309. Working as a differential circuit the amplifier 305 tries to force the thermally dependent secondary output 303 to match the thermally dependant output 307 of the thermally dependent voltage reference 309. The output of the amplifier 305 is constructed to only output a signal stealing current from the control input 311 of the bandgap reference. While the temperature is below the threshold temperature of 130° C., the thermally dependent secondary output 303, represented by curve 213, is lower than the thermally dependent voltage 307, represented by the curve 211. Because the amplifier 305 cannot add current to the control input 311 of the bandgap reference 301, the thermally dependent reference voltage 117 stays constant and is unaffected by the signal 313. Above the threshold temperature of 130° C., the thermally dependent voltage 307 is lower than the thermally dependent secondary output 303, and the amplifier 305 outputs a signal 313 stealing current from the control input 311. This is the same as stealing some of the current 423 from the current mirror output 423. Because the current mirror mirrors current in both directions, the current 415 is also reduced. This results in a reduction of current 413 forcing the thermally dependent secondary output 303 to conform to the thermally dependent voltage 307 supplied at the output of the thermally dependent voltage reference 309. This results in the thermally dependent reference voltage 117 being lowered so it now tracks the the thermally dependent voltage 307 supplied at the output of the thermally dependent voltage reference 309. This is shown on the curve 215 in FIG. 2. Because the amplifier 305 has a high gain, the threshold temperature 209 can be crisply defined. This overcomes the prior art deficiency of an ill defined softly sloping thermally dependent charge voltage.

For the temperature below the threshold temperature of 130° C., the bandgap reference circuit 301 provides a very stable and constant substantially zero temperature dependence for the thermally dependent reference voltage 117. This results in the desired thermally dependent reference voltage 117 output from the temperature reference 115 and consequently the desired temperature dependence of the charge voltage 109 to the battery 111.

Prior bandgap circuits do not utilize a secondary output of the bandgap to modify the bandgap circuit operation so as to create an accurate and stable temperature threshold for the primary bandgap output signal.

Figure 5:
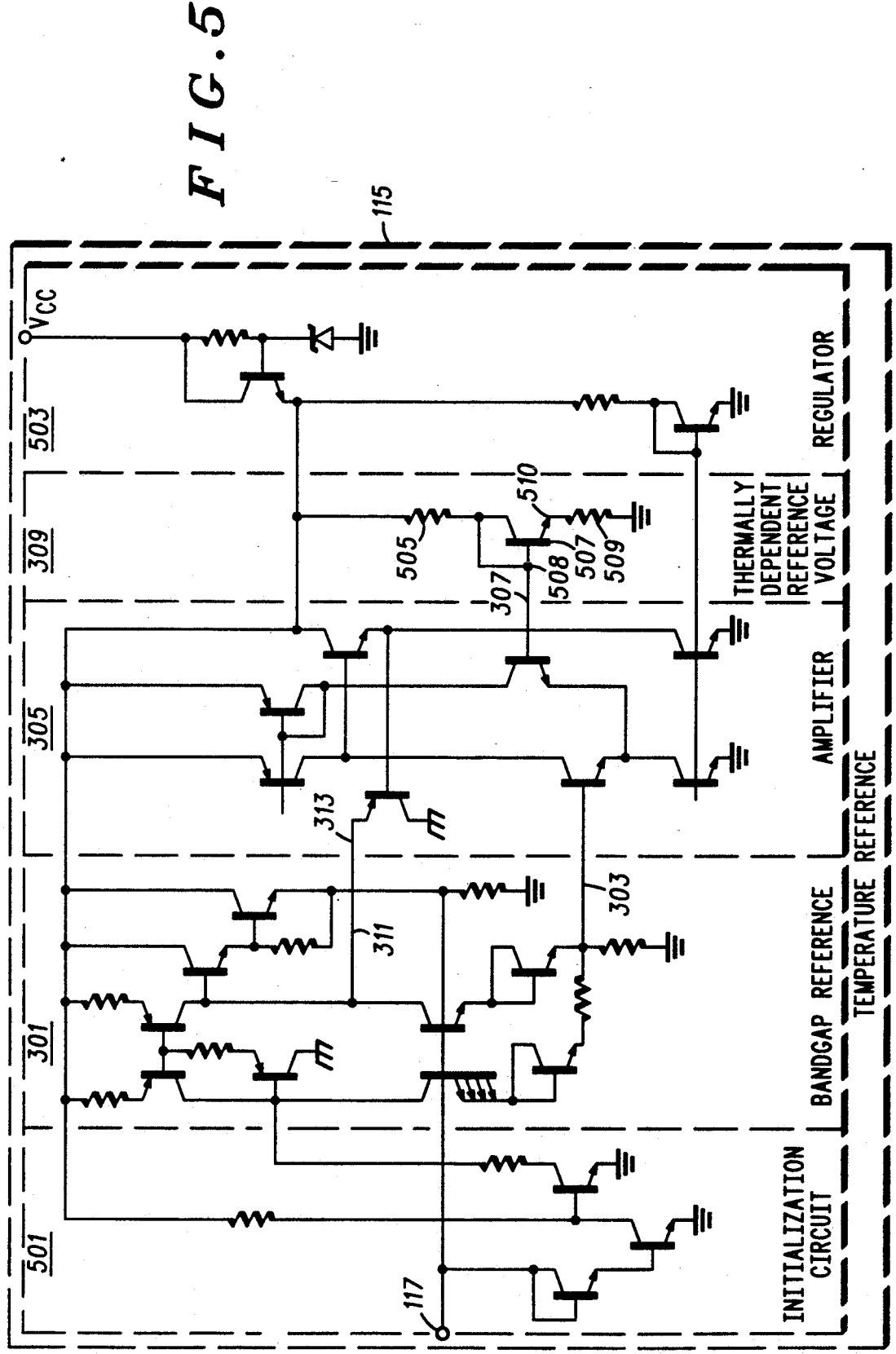
FIG. 5 shows a detailed schematic of the temperature dependent voltage reference circuit shown in FIG'S. 3 and 4.

FIG. 5 provides further details of the temperature reference 115 in schematic form. This schematic includes an initialization circuit 501 for ensuring the start of the bandgap reference 301, and a regulator 503 for supplying a stable voltage to the circuits of the temperature reference 115.

In FIG. 5, the thermally dependent voltage reference 309 is detailed and includes a first resistor 505, connected to anode 508 of a diode 507, and a second resistor 509, connected the a cathode 510 of the diode 507. These resistors 505 and 509 are scaled to choose a predetermined slope for the temperature dependence of this thermally dependent voltage reference circuit 309. In FIG. 5, the amplifier 305 is illustrated in further detail.

Of course, the temperature response characteristics of the aforementioned references can be easily modified to achieve other charge voltage temperature dependencies as desired. It would also be obvious to one of ordinary skill in the art to apply the described thermally dependent self-modifying voltage source into other applications. These applications may include thermally protected voltage regulators and thermally protected load drivers to suggest a few.

What is claimed is:

1. A thermally dependent self-modifying voltage source comprising:

a first reference means having a control input, a primary output dependent on the control input, and a thermally dependent secondary output;

a thermally dependent reference means having an output; and an amplifier with a first input coupled to the thermally dependent secondary output of said first reference means, a second input coupled to the output of said thermally dependent reference means, and an output coupled to the control input of said first reference means, wherein the primary output of said first reference means is dependent on the amplified difference between the thermally dependent secondary output of said first reference means and the output of said thermally dependent reference, wherein above a predetermined temperature, the voltage at the primary output of said first reference means changes more than one millivolt per degree Celsius as a function of temperature.

2. A thermally dependent self-modifying voltage source in accordance with claim 1 wherein said first reference means further comprises a bandgap circuit.

3. A thermally dependent self-modifying voltage source in accordance with claim 2 wherein said bandgap circuit further comprises:

a current mirror having an input and an output;

a first transistor having a base, an emitter, and a collector, the collector coupled to the output of said current mirror and the emitter having a first predetermined area;

a first resistor having a first terminal and a second terminal, the first terminal coupled to the emitter of said first transistor;

a second transistor having a base, an emitter, and a collector, the base coupled to the base of said first transistor, the emitter having a second predetermined area larger than the first predetermined area of the emitter of said first transistor, the emitter of said second transistor coupled to the second terminal of said first resistor and the collector coupled to the input of said current mirror;

a second resistor coupled to the first terminal of said first resistor, wherein said thermally dependent secondary output is provided at the coupling of said second resistor and the first terminal of said first resistor; and a third transistor having a base and an emitter, the base coupled to the output of said current mirror, wherein said control input is provided at the coupling of the base of said third transistor and the output of said current mirror, and the emitter of said third transistor coupled to the base of said first transistor, wherein said primary output is provided at the coupling of the coupling of the emitter of said third transistor and the base of said first transistor.

4. A thermally dependent self-modifying voltage source in accordance with claim 3 wherein said third transistor further comprises a darlington transistor.

5. A thermally dependent self-modifying voltage source in accordance with claim 1 wherein the output of said thermally dependent reference means has a negative temperature dependence.

6. A thermally dependent self-modifying voltage source in accordance with claim 5 wherein said negative temperature dependence is greater than one millivolt per degree Celsius.

7. A thermally dependent self-modifying voltage source in accordance with claim 1 wherein below the predetermined temperature the voltage at the primary output of said first reference means is substantially constant as a function of temperature.

8. A voltage regulator integrated circuit for an alternator based charging system for supplying a thermally dependent charge voltage to a battery comprising:
- a first voltage reference having a control input, a primary output dependent on the control input, and a thermally dependent secondary output;
- a thermally dependent voltage reference having an output;
- an amplifier with a first input coupled to the thermally dependent secondary output of said first voltage reference, a second input coupled to the output of said thermally dependent voltage reference, and an output coupled to the control input of said first voltage reference, wherein the primary output of said first voltage reference is dependent on the amplified difference between the thermally dependent secondary output of said first voltage reference and the output of said thermally dependent voltage reference;
- an attenuator having an input and an output, the input to be coupled to a voltage sense terminal and the output, responsive to the input, for providing a voltage; and
- a control system with a first input, a second input and an output, the first input coupled to the primary output of said first voltage reference, the second input coupled to the output of said attenuator and wherein the output of said control system generates a control signal in response to the primary output of said first voltage reference and the output of said attenuator, said control system output control signal to be connected to said alternator.

9. A voltage regulator integrated circuit in accordance with claim 8 wherein said first voltage reference further comprises a bandgap circuit.

10. A voltage regulator integrated circuit in accordance with claim 8 wherein the output of said thermally dependent voltage reference has a negative temperature dependence.

11. A voltage regulator integrated circuit in accordance with claim 10 wherein said negative temperature dependence is greater than one millivolt per degree Celsius.

12. An alternator based charging system comprising:
- a battery;
- an alternator with a field coil, the field coil coupled to said battery, said alternator for charging said battery;
- a transistor with a control input and an output, the output coupled to said field coil, wherein responsive to a be provided control signal at the control input of said transistor the field coil of said alternator is driven thereby charging said battery;
- a voltage sensing circuit having an input to be coupled to said alternator and an output supplying a sensed voltage indicative of the voltage generated by the alternator;
- a first voltage reference having an input, a primary output dependent on the input, and a thermally dependent secondary output;
- a thermally dependent voltage reference having an output;
- a first amplifier with a first input coupled to the thermally dependent secondary output of said first voltage reference, a second input coupled to the output of said thermally dependent voltage reference, and an output coupled to the input of said first voltage reference, wherein the primary output of said first voltage reference is dependent on the amplified difference between the thermally dependent secondary output of said first voltage reference and the output of said thermally dependent voltage reference; and
- a control system with a first input, a second input and an output, the first input coupled to the output of said voltage sensing circuit, the second input coupled to the primary output of said first voltage reference, and the output of said control system coupled to the control input of said transistor, wherein said control system, responsive to the output of said voltage sensing circuit and the primary output of said first voltage reference, generates said to be provided control signal coupled to the control input of said transistor for charging said battery.

13. An alternator based charging system in accordance with claim 12 wherein above a predetermined temperature, the voltage at the primary output of said first voltage reference changes more than one millivolt per degree Celsius.

14. An alternator based charging system in accordance with claim 13 wherein below the predetermined temperature, the voltage at the primary output of said first voltage reference is substantially constant as a function of temperature.

15. A thermally dependent self-modifying voltage source comprising:
- a first voltage reference circuit having a control input, a primary output responsive to the control input, and a thermally dependent secondary output including,
- a current mirror having an input and an output, the output corresponding to the control input of said first voltage reference circuit,
- a first transistor having a base, an emitter, and a collector, the emitter having a first predetermined area and the collector coupled to the output of said current mirror,
- a first resistor having a first terminal and a second terminal, the first terminal coupled to the emitter of said first transistor,
- a second transistor having a base, an emitter, and a collector, the base coupled to the base of said first transistor, the emitter having a second predetermined area larger than the first predetermined area of the emitter of said first transistor, the emitter of said second transistor coupled to the second terminal of said first resistor and the collector coupled to the input of said current mirror,
- a second resistor coupled to the first terminal of said first resistor, wherein said thermally dependent secondary output is provided at the coupling of said second resistor and the first terminal of said first resistor,
- a third transistor having a base and an emitter, the base coupled to the output of said current mirror, wherein said control input is provided at the coupling of the base of said third transistor and the output of said current mirror, the emitter of said third transistor coupled to the base of said first transistor, wherein said primary output is provided at the coupling of the coupling of the emitter of said third transistor and the base of said first transistor;

a thermally dependent voltage reference circuit including, a reference diode having a cathode and an anode, a third resistor coupled to the cathode of said reference diode, a fourth resistor coupled to the anode of said reference diode wherein a thermally dependent voltage is provided at the coupling between said fourth resistor and the anode of said reference diode, said fourth resistor, said diode, and said third resistor forming a series circuit connected between a voltage potential; and an amplifier with a first input coupled to the thermally dependent secondary output of said first reference means, a second input coupled to said thermally dependent voltage of said thermally dependent voltage reference circuit, and an output coupled to the control input of said first voltage reference, wherein the primary output of said first voltage reference circuit is dependent on the amplified difference between the thermally dependent secondary output of said first reference means and the thermally dependent voltage of said thermally dependent voltage reference circuit.

16. A thermally dependent self-modifying voltage source in accordance with claim 15 wherein the second predetermined area of said emitter is four times larger than the first predetermined area of the emitter of said first transistor.

17. A thermally dependent self-modifying voltage source in accordance with claim 15 wherein said third transistor further comprises a darlington transistor.

* * * * *